United States Patent
Kelley et al.

(10) Patent No.: US 6,320,671 B1
(45) Date of Patent: Nov. 20, 2001

(54) WEB BROWSER PRINTING ENHANCEMENTS

(75) Inventors: Edward E. Kelley, Wappingers Fall; Norman J. Dauerer, Hopewell Junction, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,552

(22) Filed: May 15, 1998

(51) Int. Cl.$^7$ .............................. B41B 15/00; H04N 1/40; H04N 1/32
(52) U.S. Cl. ..................... 358/1.18; 358/1.17; 358/448; 358/468; 382/219; 382/221; 382/222; 707/101; 707/517; 707/523; 707/526
(58) Field of Search ................................ 358/1.18, 1.17, 358/468, 448, 444; 382/219, 221, 222; 707/517, 101, 523, 526

(56) References Cited

U.S. PATENT DOCUMENTS

| | | |
|---|---|---|
| 4,763,356 | 8/1988 | Day, Jr. et al. . |
| 5,530,759 | 6/1996 | Braudaway et al. . |
| 5,647,056 | 7/1997 | Barrett et al. . |
| 6,061,700 * | 5/2000 | Brobst et al. .......................... 707/517 |

OTHER PUBLICATIONS

Canon Internet Web Page, "Put the Power of the Web in Print", www.ccsi.canon.com/webrecord/, Apr. 1987.*

IBM Technical Disclosure Bulletin,, "Temporary Global Passwords", Viol, 36, No, 03, Mar. 1993; pp. 451–453.

IBM Technical Disclosure Bulletin, "Resource Access Control Facility Password Propagation for Multiple Virtual Storage", vol. 36, No. 06B, Jun. 1993; pp. 419–420.

IBM Technical Disclosure Bulletin, "Network Signon Coordination Configuration", vol. 36, No. 12, Dec. 1992; pp. 389–396.

Canon Intternet Web Page, Put the Power of He Web Inprint, www.ccsi.canon.com./webrecord/, Apr. 24, 1997.

* cited by examiner

Primary Examiner—Edward Coles
Assistant Examiner—Twyler Lamb
(74) Attorney, Agent, or Firm—DeLio & Peterson, LLC; Kelly M. Reynolds (57) ABSTRACT

A method and system for printing web pages from an intra- or internet source with a client computer. The client computer is capable of accessing and viewing a web page from an intra- or internet source and has access to a program storage. The program storage device includes (i) an HTML source file containing a list of printable web pages and (ii) a program of instructions executable by the computer at a predetermined, modifiable time to print web pages from the intra- or internet source with the client computer. The program selects one or more of the printable web pages from the HTML source file, accesses the web pages selected from the HTML source file, and prints the accessed web pages. The printable web pages may be accessed on different levels of hierarchy in HTML files. The storage device also contains a plurality of different lists of printable web pages and a menu of each of the lists, whereby the method includes selecting from the menu a desired list and providing an HTML source file containing the desired list of printable web pages.

22 Claims, 5 Drawing Sheets

WEB BROWSER PRINTING ENHANCEMENTS

BACKGROUND OF THE INVENTION

1. Field of the Invention

The present invention relates to computer programs and in particular to software for a method and system for printing any number of desired entries from selected web pages accessed from an intra- or internet source.

2. Description of Related Art

Current web browsers currently have no easy way to print large numbers of selected entries from selected web pages. For example, it would be quite time consuming if one had to print a number of daily production reports from a series of web pages, particularly if one had to print each of these reports every day from a daily review of these reports. To print a web page with the current technology, a user first accesses an intra- or internet source and selects the desired web page. The user then selects the web print function for each entry then waits for each page to be printed. This cumbersome method is repeated to print each of a small or large number of web pages each day.

Accordingly, it would be useful if there were a method and system which simplified the printing of desired web pages from an intra- or internet source, which method did not require the time or delay of the prior art. Such a method and system would preferably improve prior art methods of selecting the desired web pages for such printing.

Bearing in mind the problems and deficiencies of the prior art, it is therefore an object of the present invention to provide an improved method and system for printing desired web pages from an intra- or internet source.

It is another object of the present invention to provide a method and system which improves prior art methods of selecting the desired web pages for such printing.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of printing web pages from an intra- or internet source with a client computer. The method comprises initially providing in a storage device accessible by the client computer a list of printable web pages from an intra- or internet source and providing an HTML source file containing the list of printable web pages. The HTML source file containing the list of printable web pages is then viewed at the client computer and one or more of the printable web pages is selected from the HTML source file. The web pages selected from the HTML source file are then accessed and printed.

The printable web pages may be located on different levels of hierarchy in HTML files accessible by the client computer from an intra- or internet source.

Preferably, there is provided in the storage device accessible by the client computer a plurality of different lists of printable web pages from an intra- or internet source and a menu of each of the lists. In such case, the method then comprises the steps of selecting from the menu a desired list and providing an HTML source file containing the desired list of printable web pages.

The steps of selecting one or more of the printable web pages from the HTML source file, accessing the web pages selected from the HTML source file and printing the accessed web pages may be executed by a command, previously stored in the storage device accessible by the client computer, at a predefined time. The predefined time may be modified for executing such steps.

The HTML source file containing the list of printable web pages may further contain an identification of a printer, such that the web pages may be automatically printed on such printer. The identification of the printer in the HTML source file may be changed prior to printing.

In another aspect, the present invention provides a related method of printing web pages from an intra- or internet source with a client computer. The method includes initially providing in a storage device accessible by the client computer a plurality of different lists of printable web pages from an intra- or internet source and a menu of each of the lists. A desired list is then selected from the menu. An HTML source file containing the desired list of printable web pages and an identification of a printer is then provided and the HTML source file containing the list of printable web pages is viewed at the client computer. One or more of the printable web pages is selected from the HTML source file and the web pages selected from the HTML source file are accessed and printed on the printer. The printable web pages may be located on different levels of hierarchy in HTML files accessible by the client computer from an intra- or internet source. The method may including the step of changing the identification of the printer in the HTML source file prior to printing.

The steps of selecting one or more of the printable web pages from the HTML source file, accessing the web pages selected from the HTML source file and printing the accessed web pages, may be executed by a command, previously stored in the storage device accessible by the client computer, at a predefined time, which predetermined time may be modified.

In a further aspect, the present invention provides another related method of printing web pages from an intra- or internet source with a client computer, which method includes providing in a storage device accessible by the client computer a plurality of different lists of printable web pages identified from an intra- or internet source and providing in the storage device a menu of each of the lists of printable web pages. The menu is viewed at the client computer and a desired list is selected from the menu. An HTML source file containing the desired list of printable web pages is provided and the HTML source file containing the list of printable web pages is viewed at the client computer. One or more of the printable web pages is selected from the HTML source file. The web pages selected from the HTML source file are then accessed and printed.

The method may also include the step of modifying the identified printable web pages in at least one of the lists in the storage device. The method may further include the step of adding at least one additional list of identified printable web pages from an intra- or internet source to the storage device, and modifying the menu in the storage device to add the at least one additional list.

In yet another aspect, the present invention provides a system for printing web pages from an intra- or internet source with a client computer. The system comprises a client computer capable of accessing a web page from an intra- or internet source and viewing the web page and a program storage device accessible by the client computer. The program storage device includes therein an HTML source file containing a list of printable web pages from the intra- or internet source. The program storage device preferably further includes a program of instructions executable by the computer at a predetermined time to print web pages from the intra- or internet source with the client computer. The program comprises the steps of selecting one or more of the printable web pages from the HTML source file, accessing the web pages selected from the HTML source file, and printing the accessed web pages. The printable web pages may be accessed on different levels of hierarchy in HTML files accessible by the client computer from an intra- or internet source.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–5 of the drawings in which like numerals refer to like features of the invention. Features of the invention are not necessarily shown to scale in the drawings.

The present invention provides a method and system for selecting multiple web documents from a web page, storing the names of the selected documents in a list, naming the list, storing the named list in a list of named lists and accessing the list of named lists of saved web documents. Associated with the lists is the name of the printer where the documents are to be printed. Access to the menu of print lists permits any or multiple lists to be printed on the default printer. The invention also provides a feature that permits the printer to be dynamically changed to any attached printer.

A further feature on the invention is the ability to select all of the documents on a page and have the names of the documents stored in a named list. Also, the invention permits placement of all documents from a web page and multiple levels into the page stored on a named list.

A further feature of the invention is the ability to select some or all of the URLS on a web page and have the names of the URLS stored in a print list, as well as the ability to place some or all of the URLS from a web page and multiple levels into the page stored on a print list.

The invention also permits selected lists to be automatically scheduled for printing one or more times per day, for example, when the computer is first turned on.

Definitions relevant to the present invention are as follows:

HTML—Hypertext Markup Language.

HTML Tags—Sections of text marked with < and > symbols to indicate the meaning of each part of the HTML document.

HTML Source File—File with the HTML tags to be converted by a web browser to be displayed on a monitor.

Web page—HTML source file converted and displayed on a web browser or any screen generated by a program that is displayed on a web browser.

URL (Uniform resource locator)—A text string that indicates the server protocol to use in accessing the resource, the internet domain name of the server, and the name and location of the resource on that particular server.

Level—The hierarchy of HTML files that are associated with a URL. For example, a level of 1 includes all of the URLs that are referenced in a first HTML file; a level of 2 includes all of the URLs that are referenced by the URLs referenced in the first HTML file (the Level 1 URLs), as well as the Level 1 URLs themselves; and a level of 3 includes all of the URLs that are referenced by the Level 2 URLs, as well as the Level 1 and Level 2 URLs themselves.

Default Level—The pre-selected level used to prepare the Print HTML.

Print HTML—An HTML source file that contains selection boxes to select which URLS to print. All URLS will contain a selection box. The HTML source file will contain all of the URLS for the selected level or the default level.

Print List—A list of URLS that is to be printed, containing URLS, the printer address, name for the URLS and the scheduled time if any to print the URL. The time can be expressed as hourly, daily weekly, monthly or a specific time indicated. Whenever the URL is printed, the time of printing is indicated on the print list, to enable the process to keep track of what has been printed.

Print List Menu—Lists of URLS, that are identified by name, that are to be printed. Each list contains URLS, a default printer and name for the URLS. The default printer is used if there is no printer listed with the URL in a print list.

Personal Storage—Storage to which the user at the client computer or workstation has read and write access. The storage could include the workstation hard drive and any other program storage device that to which the workstation has read and write access.

Figure 1:
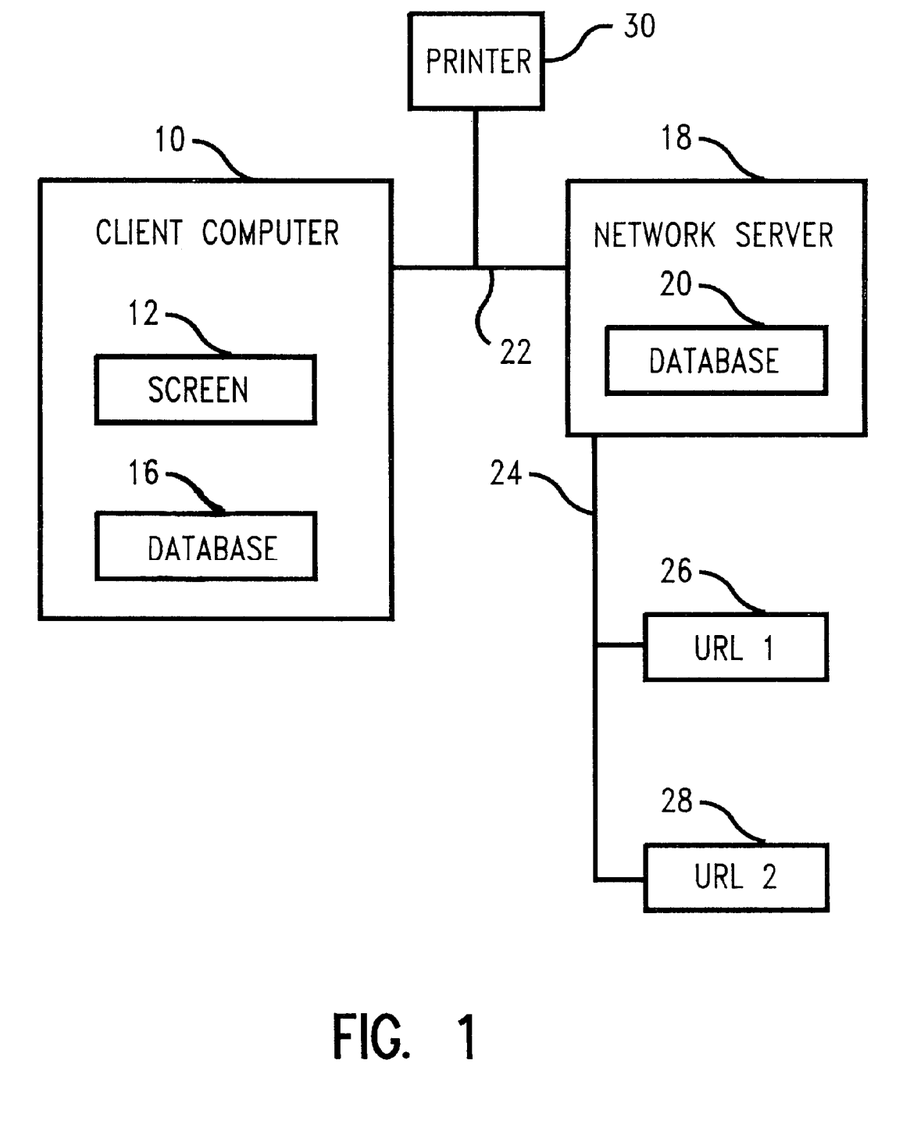
FIG. 1 is a schematic of the system of the present invention for printing any number of desired entries from selected web pages accessed from an intra- or internet source.

A typical client/network system is illustrated in FIG. 1. Client computer or network work station 10 is linked by telephone or other network cable 22 to a network server computer 18 having a database 20. Such server or database may be on the Internet or on an intranet system. Client computer 10 has a microprocessor for executing stored programs and includes a database 16 on its program storage device for storage of the saved print HTMLs, print lists, print list menus and other files and data described herein. Alternatively, such forms may be stored on database 20 on the network server 18. Data bases 16 and 20 may be physically present in the client computer or network server, but may also be located elsewhere, so long as the client computer has access to the information therein.

A screen 12 is able to display the desired web pages or other files that the service has accessed from the network. Web sites or applications 26, 28 connected to network 24 have different addresses (URLS). Such web sites contain in their web pages the data and files to be printed, which data and files are often on different levels. A printer 30 connected to the client computer or network is able to print the desired web pages.

The computer programmer software incorporating the process steps and instructions described further below, as well as the saved print HTMLs, print lists, print list menus and other files and data, may be stored in both client computers and network server on an otherwise conventional program storage device, such as a semiconductor chip, a read only memory, or magnetic media such as a diskette or computer hard drive, which is readable and executable by a computer in conjunction with a web browser such as Netscape Navigator.

The user of the method and system of the present invention, at a client computer, has the initial option to view one or more of the web pages to be printed. If the user desires to view the web page, the user may select the desired level, i.e., the hierarchy of HTML files that are associated with a particular web site. The user may also decide to use the default settings for the pages to be printed. In either event, the user prepares a Print HTML, which builds the HTML source file that contains selection boxes to select which web pages to print. The user then selects the desired web sites and optionally selects a Menu of Print Lists which contain the listing of web sites that are desired to be printed. If the Print List is selected, the selection is made and the selected item is added to the list. The user then proceeds to have the client computer print the web pages which have been previously selected.

Instead of viewing the web pages, the user may create and/or view the aforementioned Print Lists which contain the listing of web sites that the user desires to print. The user may also make changes to the commands which provide for automatic printing of the desired web sites, for example, at the start of day when the system is first turned on. Alternatively, the user may manually issue a command to print the desired web pages.

Figure 2:
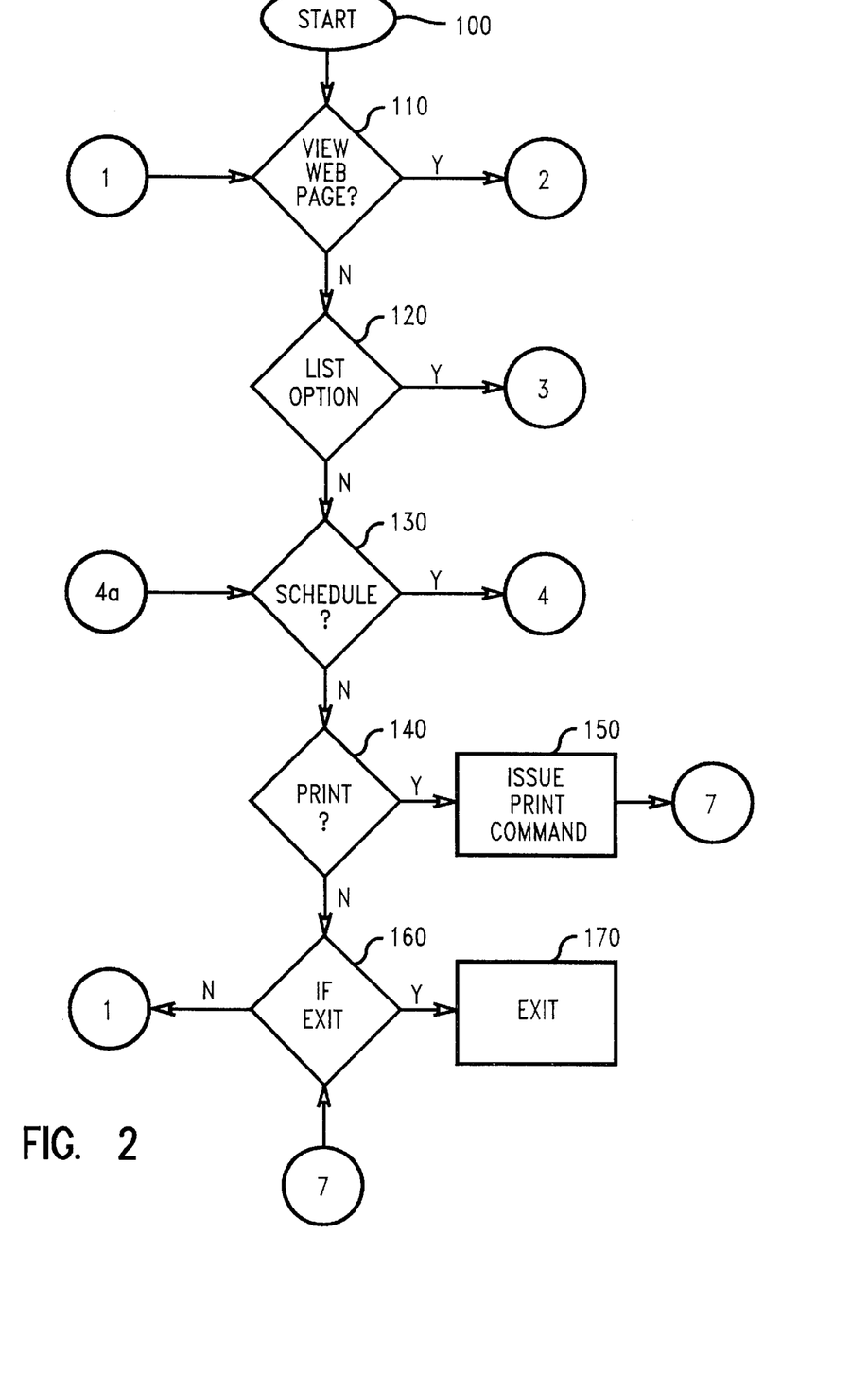
FIGS. 2–5 are block diagram flow charts of the preferred steps employed in practicing the present invention, where encircled numerals indicate links between the steps.

Flow charts for the process used in the present invention are shown in FIGS. 2–5. Numerals in circles indicate connections to and from other parts of the flow chart which may be in different figures. FIG. 2 illustrates the overall use of the processing system of the present invention to print any number of desired entries from selected web pages accessed from an intra- or internet source. The preferred steps are as follows:

100 Start the process.
110 View web page? Does the user want to view a web page?
120 List option? Does the user want to get into the list option?
130 Schedule? Does the user want to get into the schedule option?
140 Print? Does the user want to get into the print option?
150 Issue print command. Issue the print command for all of the URLS that are in the HTML source file or in the source of the web page. The print command will begin printing immediately.
160 If exit? Is the user ready to exit?
170 Ext. Exit the process.

Figure 3:
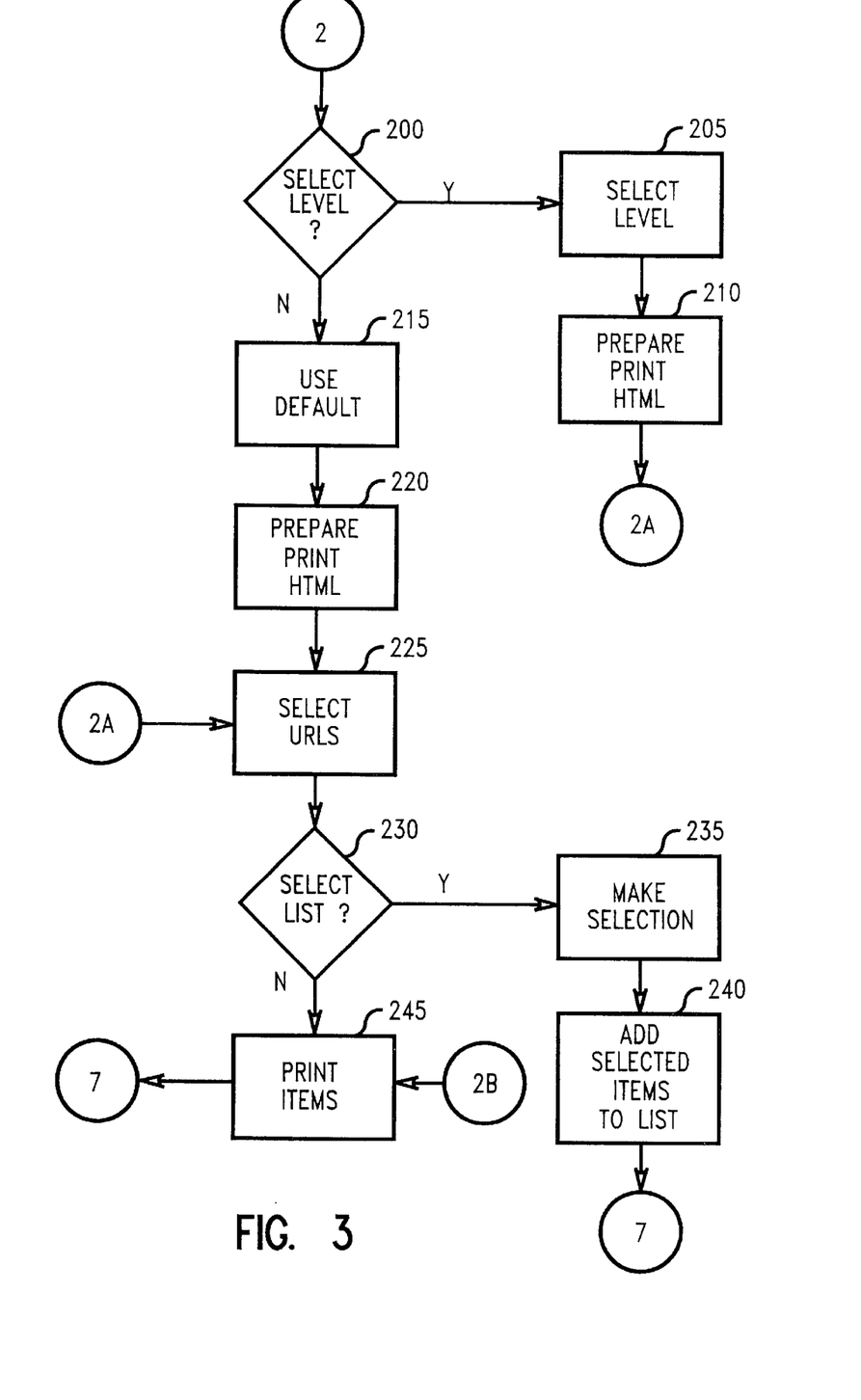

FIG. 3 illustrates the process and system for creating and preparing the print HTML file which is used to select the web pages desired for printing. The preferred steps are as follows:

200 Select level? Do we want to select the level?
205 Select level. Select the level that we want to print.
210 Prepare print HTML. Build an HTML source file that contains selection boxes to select which URLS to print. All URLS will contain a selection box. The HTML source file will contain all of the URLS for the selected level.
215 Use default. Use the default level.
220 Prepare print HTML. Build an HTML source file that contains selection boxes to select which items to print. All URLS will contain a selection box. The HTML source file will contain all of the URLS for the default level.
225 Select URLS. Select the URLS to print from the print HTML file.
230 Select list? Do we want to select the menu of print lists?
235 Make selection. Make a selection of one of the print lists?
240 Add selected items to the list. The items from the print HTML file that we have selected will be automatically added the selected print list.
245 Print items. Immediately print the selected items.

Figure 4:
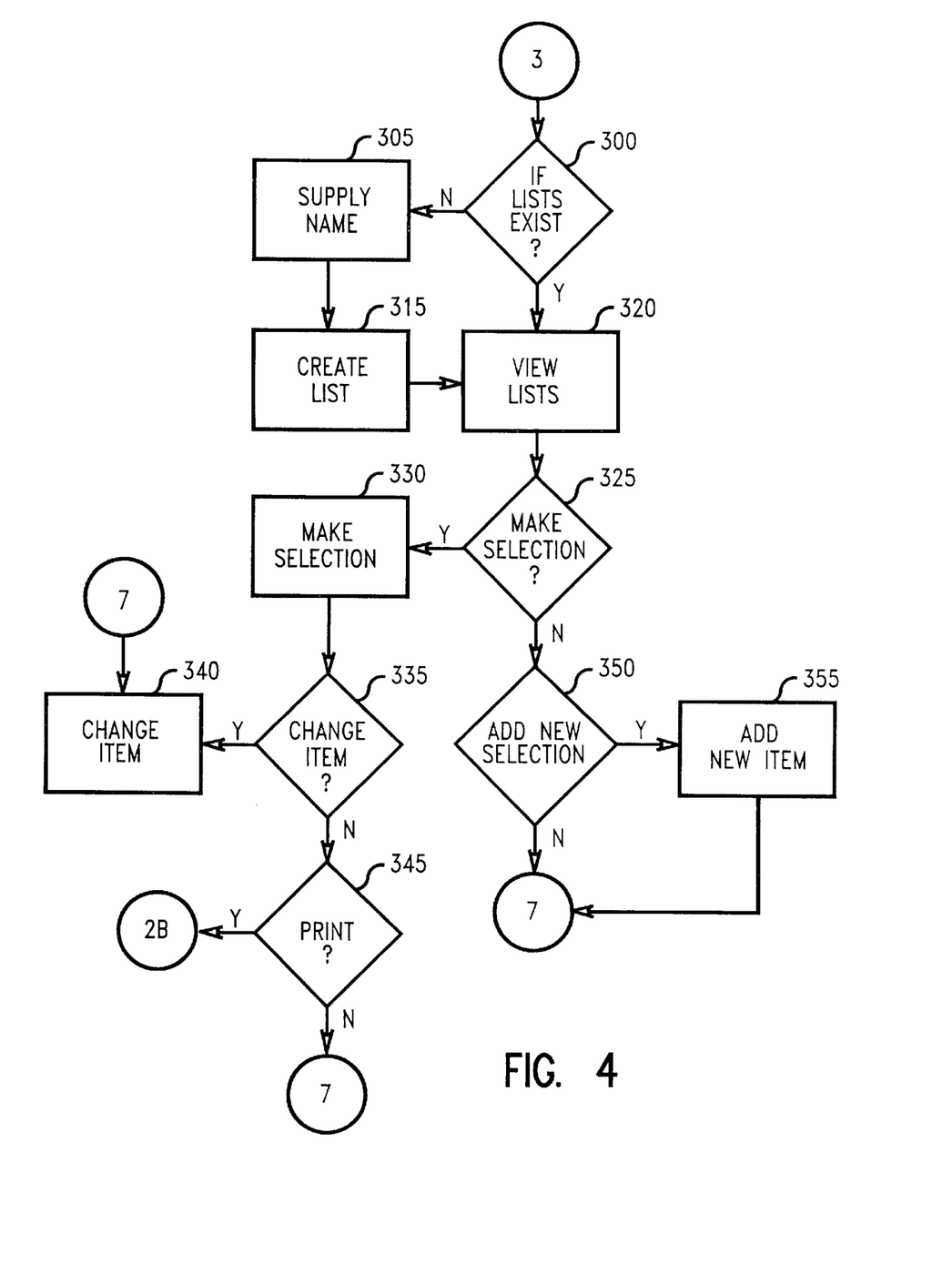

FIG. 4 illustrates the process and system for creating and preparing the print list menu of different lists of printable web pages. The preferred steps are as follows:

300 If lists exist? Does at least one print list exist?
305 Supply name. Supply the name of the print lists that the user wants to build.
315 Create List. Create the print list.
320 View lists. View the menu of print lists.
325 Make a selection? Does the user want to make a selection from the menu of print lists.
330 Make selection. Make a selection from the menu of print lists and make a selection from the selected print list.
335 Change item? Does the user want to change the URL or the name of the URL in a print list or add a new URL and name to the URL.
340 Change the URL or the name of the URL in a print list or add a new URL and name to the URL.
345 Print? Does the user want to print the URLs in the Print List?
350 Add new selection? Does the user want to add a new print lists to the menu of print lists?
355 Add a new print lists to the menu of print lists.

Figure 5:
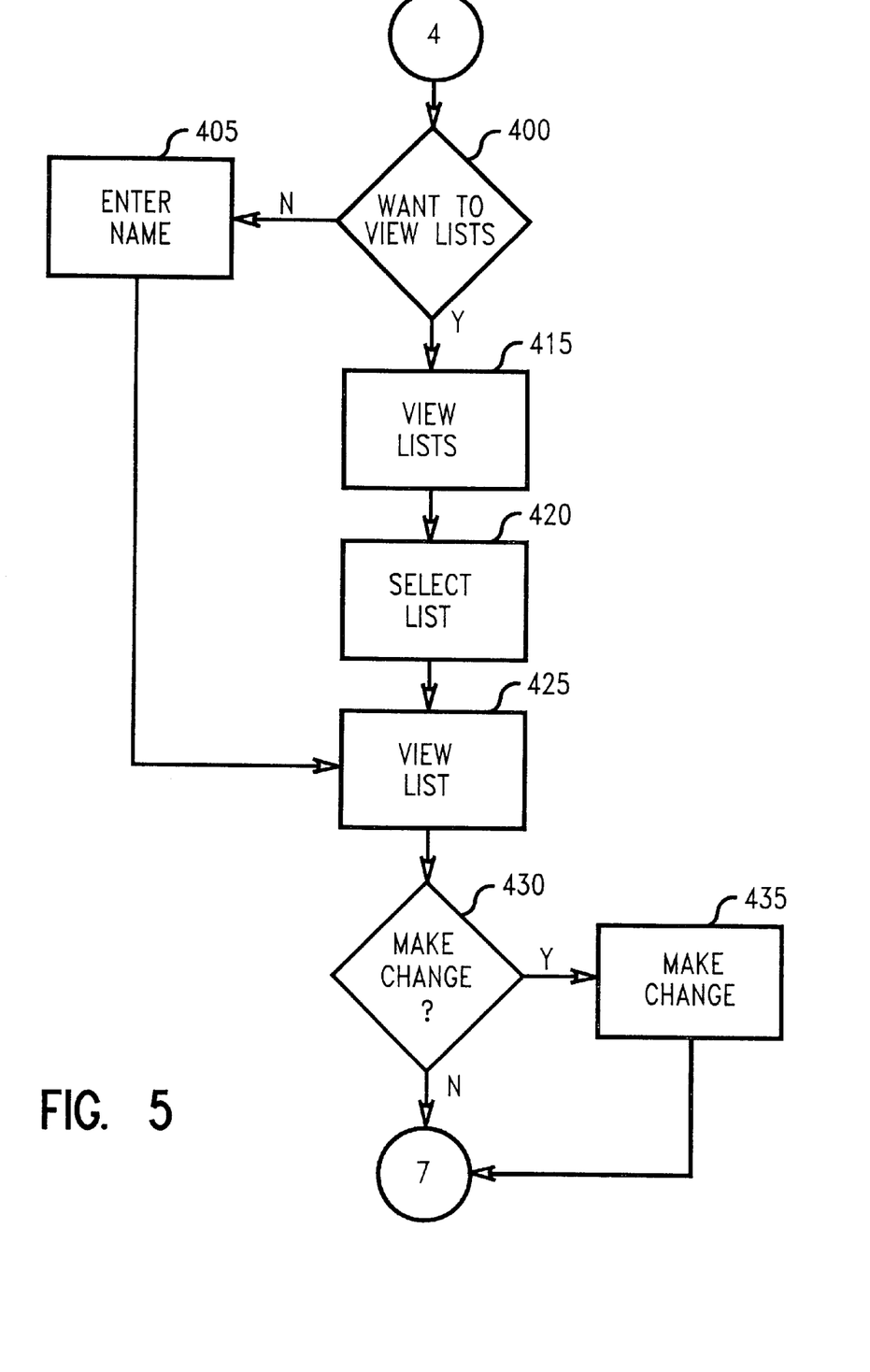

FIG. 5 illustrates the process and system for viewing the menu of print lists, selecting the desired print list, and preparing the schedule of printing of the selected web pages. The preferred steps are as follows:

400 Want to view lists? Does the user want to view the lists of print lists?
405 Enter name. Enter the name of the print lists.
415 View lists. View the menu of print lists.
420 Select lists. Select a print list from the menu of print lists.
425 View list. View the selected print list.
430 Make changes? Does the user want to make changes to the print schedule or add a print schedule?
435 Make change. Make changes to the print schedule or add a print schedule? The print schedule is based on the calendar and time of day. It is also allows the print lists to be printed whenever the computer is turned on. Whenever a URL is printed, an indicator is made on the print lists for that scheduled time. The scheduled time can be a specific time or can be daily, hourly, weekly or monthly.

The present invention permits easy selection of printing, optionally automatically at pre-selected times, in manufacturing and engineering applications. For example, yield, loss, and production reports, which may be stored on a company's intra- or internet accessible database, may be automatically printed at predetermined intervals. As more companies move their internal data to internal web applications, these capabilities will be especially important.

Accordingly, the present invention achieves the objects identified above in providing an improved method and system for printing desired web pages from an intra- or internet source.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of printing web pages from an intra- or internet source with a client computer comprising the steps of:
    a) providing in a storage device accessible by said client computer a list of printable web pages from an intra- or internet source, said list of printable web pages having associated therewith an identification of a printer;
    b) providing a stored HTML source file containing said list of printable web pages;
    c) viewing said stored HTML source file containing said list of printable web pages at said client computer;
    d) selecting one or more of said printable web pages from said stored HTML source file;
    e) accessing the web pages selected from the stored HTML source file; and
    f) printing the accessed web pages on said printer.

2. The method of claim 1 wherein said printable web pages are located on different levels of hierarchy in HTML files accessible by said client computer from an intra- or internet source.

3. The method of claim 1 wherein step (a) comprises providing in a storage device accessible by said client computer a plurality of different lists of printable web pages from an intra- or internet source and a menu of each of said lists, further including between steps (a) and (b) the step of selecting from said menu a desired list, and wherein step (b) comprises providing an HTML source file containing said desired list of printable web pages.

4. The method of claim 1 wherein said steps (d) selecting one or more of said printable web pages from said HTML source file, (e) accessing the web pages selected from the HTML source file, and (f) printing the accessed web pages, are executed by a command, previously stored in said storage device accessible by said client computer, at a predefined time.

5. A method of printing web pages from an intra- or internet source with a client computer comprising the steps of:
    a) providing in a storage device accessible by said client computer a plurality of different lists of printable web pages identified from an intra- or internet source, said list of printable web pages having associated therewith an identification of a printer;
    b) providing in said storage device a menu of each of said lists of printable web pages;
    c) viewing said menu at said client computer;
    d) selecting from said menu a desired list;
    e) providing an HTML source file containing said desired list of printable web pages;
    f) viewing said HTML source file containing said list of printable web pages at said client computer;
    g) selecting one or more of said printable web pages from said HTML source file;
    h) accessing the web pages selected from the HTML source file; and
    i) printing the accessed web pages on said printer.

6. The method of claim 5 further including the step of modifying the identified printable web pages in at least one of said lists in said storage device.

7. The method of claim 5 further including the step of adding at least one additional list of identified printable web pages from an intra- or internet source to said storage device, and modifying said menu in said storage device to add said at least one additional list.

8. The method of claim 5 wherein said printable web pages are located on different levels of hierarchy in HTML files accessible by said client computer from an intra- or internet source.

9. The method of claim 5 wherein said steps (g) selecting one or more of said printable web pages from said HTML source file, (h) accessing the web pages selected from the HTML source file, and (i) printing the accessed web pages, are executed by a command, previously stored in said storage device accessible by said client computer, at a predefined time.

10. A system for printing web pages from an intra- or internet source with a client computer comprising:
    a client computer capable of accessing a web page from an intra- or internet source and viewing said web page; and
    a program storage device accessible by said client computer, said program storage device having a stored HTML source file containing a list of printable web pages from said intra- or internet source, said list of printable web pages having associated therewith an identification of a printer, said program storage device further having a program of instructions executable by the computer at a predetermined time to print web pages from said intra- or internet source with said client computer comprising the steps of:
        a) selecting one or more of said printable web pages from said HTML source file having associated therewith said identification of said printer;
        b) accessing the web pages selected from the HTML source file; and
        c) printing the accessed web pages on said printer.

11. The system of claim 10 wherein step (b) includes accessing the printable web pages on different levels of hierarchy in HTML files accessible by said client computer from an intra- or internet source.

12. A method of printing web pages from an intra- or internet source with a client computer comprising the steps of:
    a) providing in a storage device accessible by said client computer a list of printable web pages from an intra- or internet source, said list of printable web pages having associated therewith an identification of a printer;
    b) providing an HTML source file containing said list of printable web pages;
    c) viewing said HTML source file containing said list of printable web pages at said client computer;
    d) selecting one or more of said printable web pages from said HTML source file by executing a command, previously stored in said storage device accessible by said client computer, at a predefined time;

e) accessing the web pages selected from the HTML source file using said command at said predefined time;

f) printing the accessed web pages using said command at said predefined time; and g) modifying said predefined time for executing steps (d), (e) and (f).

13. The method of claim 12 wherein step (a) comprises providing in a storage device accessible by said client computer a plurality of different lists of printable web pages from an intra- or internet source and a menu of each of said lists, further including between steps (a) and (b) the step of selecting from said menu a desired list, and wherein step (b) comprises providing an HTML source file containing said desired list of printable web pages and an identification of a printer.

14. The method of claim 13 further including between steps (a) and the step of selecting from said menu a desired list, the steps of viewing said menu at said client computer.

15. A method of printing web pages from an intra- or internet source with a client computer comprising the steps of:

a) providing in a storage device accessible by said client computer a list of printable web pages from an intra- or internet source, said list of printable web pages having associated therewith an identification of a printer;

b) providing an HTML source file containing said list of printable web pages;

c) viewing said HTML source file containing said list of printable web pages at said client computer;

d) selecting one or more of said printable web pages from said HTML source file;

e) accessing the web pages selected from the HTML source file; and f) printing the accessed web pages on said printer.

16. The method of claim 15 further including the step of changing the identification of said printer in said HTML source file prior to step (f).

17. The method of claim 15 wherein step (a) comprises providing in a storage device accessible by said client computer a plurality of different lists of printable web pages from an intra- or internet source and a menu of each of said lists, and further including between steps (a) and (b) the step of selecting from said menu a desired list.

18. The method of claim 17 wherein said printable web pages are located on different levels of hierarchy in HTML files accessible by said client computer from an intra- or internet source.

19. The method of claim 17 wherein said steps (d) selecting one or more of said printable web pages from said HTML source file, (e) accessing the web pages selected from the HTML source file, and (f) printing the accessed web pages, are executed by a command, previously stored in said storage device accessible by said client computer, at a predefined time.

20. The method of claim 17 further including the step of modifying the identified printable web pages in at least one of said lists in said storage device.

21. The method of claim 17 further including the step of adding at least one additional list of identified printable web pages from an intra- or internet source to said storage device, and modifying said menu in said storage device to add said at least one additional list.

22. A method of printing web pages from an intra- or internet source with a client computer comprising the steps of:

a) providing in a storage device accessible by said client computer a plurality of different lists of printable web pages from an intra- or internet source and a menu of each of said lists; said list of printable web pages having associated therewith an identification of a printer;

b) selecting from said menu a desired list;

c) providing an HTML source file containing said desired list of printable web pages;

d) viewing said HTML source file containing said list of printable web pages at said client computer;

e) selecting one or more of said printable web pages from said HTML source file;

f) changing the identification of said printer in said HTML source file;

g) accessing the web pages selected from the HTML source file; and h) printing the accessed web pages on said printer.

* * * * *

UNITED STATES PATENT AND TRADEMARK OFFICE
CERTIFICATE OF CORRECTION

| | | |
|---|---|---|
| PATENT NO. | : 6,320,671 B1 | Page 1 of 1 |
| DATED | : November 20, 2001 | |
| INVENTOR(S) | : Edward Kelley et al. | |

It is certified that error appears in the above-identified patent and that said Letters Patent is hereby corrected as shown below:

<u>Column 4,</u>
Line 32, after "hourly," delete "dailyweekly," and substitute therefor -- daily, weekly, --.

<u>Column 6,</u>
Line 59, after "It" delete "is".

Signed and Sealed this

Seventh Day of May 2002

Attest:

Attesting Officer

JAMES E. ROGAN
Director of the United States Patent and Trademark Office